United States Patent Office 3,052,706
Patented Sept. 4, 1962

3,052,706
SULFUR, NITROGEN-CONTAINING ESTERS,
AND PREPARATION THEREOF
Moses Wolf Goldberg, Upper Montclair, and Hanns Hanina Lehr, Montclair, N.J., assignors to Hoffmann-La Roche Inc., Nutley, N.J., a corporation of New Jersey
No Drawing. Filed Nov. 23, 1959, Ser. No. 854,569
9 Claims. (Cl. 260—453)

This invention relates to novel chemical compounds and to a novel method for preparing those compounds. More particularly, the invention provides novel compounds which can be considered structurally as diesters of m-benzenedisulfohydroxamic acid with lower aliphatic alcohols which consist entirely of carbon and hydrogen atoms and a single oxygen atom, and salts thereof with non-toxic, pharmaceutically acceptable bases; said compounds being either unsubstituted or, if substituted, being substituted only by one or two nuclear substituents selected from the group consisting of lower alkyl, middle halogen, amino and lower alkanoylamino.

Representative of the acid moiety in the structure of the products of the invention are m-benzenedisulfohydroxamic acid and its nuclear substitution derivatives containing one or two substituents selected from the group consisting of lower alkyl (e.g. methyl, ethyl, isobutyl, n-hexyl and the like), middle halogen (i.e. chlorine or bromine), amino and lower alkanoylamino (e.g. acetamino, propionamino, valerylamino and the like).

Representative of the esterifying alcohols in the structure of the products of the invention are alcohols which contain not more than seven carbon atoms and which are comprised entirely of carbon and hydrogen atoms and a single oxygen atom in the hydroxyl group, e.g. methanol, ethanol, propanol, isopropanol, sec.-butanol, hexanol, allyl alcohol, propargyl alcohol and the like.

The compounds of the invention can be made by a general method which comprises reacting (a) m-benzenedisulfochloride, or a nuclearly substituted-m-benzenedisulfochloride wherein there are at most two nuclear substituents selected from the group consisting of lower alkyl, middle halogen, amino and lower alkanoylamino, with (b) a compound having not more than seven carbon atoms and represented by the formula (I)
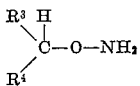

wherein each of the symbols $R^3$ and $R^4$ represents a member selected from the group consisting of hydrogen and acyclic hydrocarbon radicals.

One preferred subgroup of the broad class of products of the invention can be represented graphically by the general formula (II)
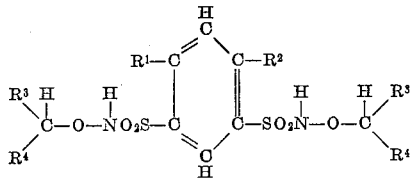

wherein each of the symbols $R^1$ and $R^2$ represents a member selected from the group consisting of lower alkyl, middle halogen, amino and lower alkanoylamino; and each of the symbols $R^3$ and $R^4$ represents a member selected from the group consisting of hydrogen and acyclic hydrocarbon radicals, the sum of the carbon atoms in the group

being not more than seven.

Another preferred subgroup of the broad class of products of the invention can be represented by the general formula (III)
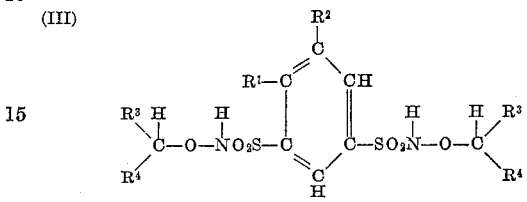

wherein the symbols $R^1$, $R^2$, $R^3$ and $R^4$ have the same significance stated above.

Another preferred subgroup of the broad class of products of the invention can be represented by the general formula (IV)
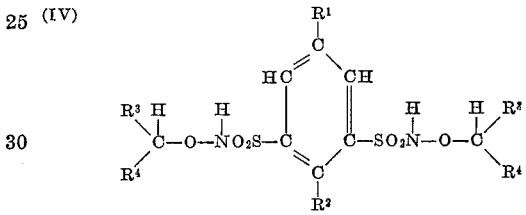

wherein the symbols $R^1$, $R^2$, $R^3$ and $R^4$ have the same significance stated above.

The diesters of the invention are acidic compounds, which form salts with bases. The invention includes such salts, especially salts of the diesters (and more particularly those of Formulas II, III and IV above) with non-toxic, pharmaceutically acceptable bases. The salts can be formed by reacting the diesters with an aqueous or alcoholic alkali, e.g. aqueous sodium hydroxide, or with solutions of non-toxic, organic bases, e.g. diethanolamine.

The novel products of the invention are useful as medicinal agents, and especially as diuretic agents. They are characterized by high natriuretic and low kaliuretic action.

Of the starting materials used in the following numbered examples, illustrative of the invention, the m-benzenedisulfochlorides have been described in the literature, except those the preparation of which is disclosed in Examples A and B below. Similarly, the substituted hydroxylamines used as starting materials have been described in the literature, except for the one which is specifically described in Example C below.

EXAMPLE A

*5-Chloro-4-Amino-1,3-Benzenedisulfochloride*

38 g. of o-chloroaniline was added in portions to 300 cc. of chlorosulfonic acid. 260 g. of sodium chloride was then added and the mixture heated for three hours at 150° C. The cooled reaction mixture was decomposed with ice-water and the crude disulfochloride was filtered off and air-dried. Yield 43.5 g. After recrystallization from benzene, the 5-chloro-4-amino-1,3-benzenedisulfochloride melted at 132-133° C.

EXAMPLE B

*5-Chloro-2-Amino-1,3-Benzenedisulfochloride*

42 g. of p-chloroacetanilide was added in portions to 560 cc. of chlorosulfonic acid. 530 g. of sodium chloride was then added and the mixture was heated for four hours to 140–150° C. The cooled reaction mixture was decomposed with ice-water, and the crude disulfochloride was filtered off and air-dried. Yield 42 g. After recrystallization from ligroin, the 5-chloro-2-amino-1,3-benzenedisulfochloride melted at 85–87° C.

EXAMPLE C

O-Propargyl Hydroxylamine 400 g. of potassium hydroxylamine disulfonate was dissolved in 2.1 liters of water containing 125 g. of potassium hydroxide. 268 g. of propargylbromide was dropped into this solution with stirring at room temperature. When all propargylbromide had been added, the mixture was heated to 60° C. for half an hour. It was then concentrated in vacuo almost to dryness. Two liters of 20% hydrochloric acid was added, and the solution heated on the steam bath for half an hour. It was then concentrated in vacuo to half of its original volume, and made alkaline by addition of 750 ml. of 40% sodium hydroxide with stirring and outside cooling. The mixture was extracted four times with ether, and the combined ether extracts were dried with sodium sulfate. Hydrochloric acid gas was then bubbled through the ether solution. The precipitated O-propargyl hydroxylamine hydrochloride was filtered off and recrystallized from ethanol-ether. It melted at 162° C. with decomposition. The compound can alternately be designated propargyloxyamine hydrochloride.

The invention is further disclosed in the following examples, which are illustrative but not limitative thereof. Temperatures are stated in degrees centigrade, corrected.

EXAMPLE 1

Dimethyl Ester of m-Benzenedisulfohydroxamic Acid 11 g. of m-benzenedisulfochloride was added to a solution of 13 g. of methoxyamine hydrochloride in 100 cc. pyridine. After standing overnight at room temperature, the mixture was added to 400 cc. of 10% HCl. The precipitated oil was extracted with ether, the extract was dried over sodium sulfate and taken to dryness. The residue crystallized slowly. After recrystallization from benzene-petroleum ether, O,O-dimethyl-m-benzenedisulfohydroxamic acid melted at 147–149°. Yield 11.5 g.

Analysis.—Calcd. for $C_8H_{12}N_2O_6S_2$: C, 32.42; H, 4.08; S, 21.64. Found: C, 32.82; H, 4.15; S, 21.70.

EXAMPLE 2

Dimethyl Ester of Toluene-2,4-Disulfohydroxamic Acid 11.6 g. of toluene-2,4-disulfochloride was added to 13 g. of methoxyamine hydrochloride, dissolved in 100 cc. of pyridine, and the mixture was kept at room temperature overnight. The solution was then added to 400 cc. of 10% HCl, and the precipitated oil was extracted with ether. The extract was dried over sodium sulfate and evaporated to dryness. The residue crystallized slowly. After recrystallization from ethyl acetate-petroleum ether, O,O-dimethyltoluene-2,4-disulfohydroxamic acid melted at 149–150°. Yield 8.8 g.

Analysis.—Calcd. for $C_9H_{14}N_2O_6S_2$: C, 34.82; H, 4.55; S, 20.66. Found: C, 35.13; H, 4.72; S, 20.41.

EXAMPLE 3

Dimethyl Ester of 4-Chloro-M-Benzenedisulfohydroxamic Acid 12.4 g. of 4-chloro-m-benzenedisulfochloride was added to a solution of 13 g. of methoxyamine hydrochloride in 100 cc. of pyridine. After standing overnight at room temperature, the solution was added to 400 cc. of 10% HCl. The precipitated oil was extracted with ether, the extract was dried over sodium sulfate and taken to dryness. The residue crystallized slowly after treatment with benzene. After recrystallization from ethyl acetate-petroleum ether, O,O-dimethyl-4-chloro-m-benzenedisulfohydroxamic acid melted at 106–107°. Yield 4 g.

Analysis.—Calcd. for $C_8H_{11}N_2O_6S_2Cl$: C, 29.05; H, 3.35; S, 19.38. Found: C, 29.46; H, 3.54; S, 19.56.

EXAMPLE 4

Dimethyl Ester of 4,6-Dimethyl-m-Benzenedisulfohydroxamic Acid 12 g. of 4,6-dimethyl-m-benzenedisulfochloride was added to a solution of 13 g. of methoxyamine hydrochloride in 100 cc. of pyridine. After standing overnight at room temperature, the solution was added to 400 cc. of 10% HCl. The precipitated solid thus obtained was filtered off, washed with water and air-dried. After recrystallization from ethanol-water, O,O,4,6-tetramethyl-m-benzenedisulfohydroxamic acid melted at 203–205°. Yield 8.6 g.

Analysis.—Calcd. for $C_{10}H_{16}N_2O_6S_2$: C, 37.03; H, 4.97. Found: C, 37.52; H, 5.09.

EXAMPLE 5

Dimethyl Ester of 5-Chlorotoluene-2,4-Disulfohydroxamic Acid 13 g. of 5-chlorotoluene-2,4-disulfochloride was added to a solution of 16.8 g. of methoxyamine hydrochloride in 100 cc. of pyridine. After standing overnight at room temperature, the solution was added to 400 cc. of 10% HCl. The precipitated oil was extracted with ether, the extract was dried over sodium sulfate and evaporated to dryness. The residue crystallized upon treatment with benzene. After recrystallization from ethyl acetate-petroleum ether, O,O-dimethyl-5-chlorotoluene-2,4-disulfohydroxamic acid melted at 159–161°. Yield 14 g.

Analysis.—Calcd. for $C_9H_{13}N_2O_6S_2Cl$: C, 31.35; H, 3.80. Found: C, 31.84; H, 3.85.

EXAMPLE 6

Dimethyl Ester of 4,6-Dichloro-m-Benzenedisulfohydroxamic Acid 13.8 g. of 4,6-dichloro-m-benzenedisulfochloride was added to 13 g. of methoxyamine hydrochloride in 100 cc. of pyridine. After standing at room temperature overnight, the solution was added to 400 cc. of 10% HCl. The precipitated solid was filtered off, washed with water and air-dried. After recrystallization from ethanol-water, O,O - dimethyl-4,6-dichloro-m-benzenedisulfohydroxamic acid melted at 177–178°. Yield 10.5 g.

Analysis.—Calcd. for $C_8H_{10}N_2O_6S_2Cl_2$: C, 26.32; H, 2.76. Found: C, 26.43; H, 2.79.

EXAMPLE 7

Dimethyl Ester of 6-Chloro-4-Amino-1,3-Benzenedisulfohydroxamic Acid 10 g. of 6-chloro-4-amino-1,3-benzenedisulfochloride was added to a solution of 12.5 g. of methoxyamine hydrochloride in 100 cc. of pyridine. After standing overnight at room temperature, the solution was added to 400 cc. of water. The precipitated oil was extracted with ether, the extract was dried over sodium sulfate and taken to dryness. The residue solidified after treatment with benzene. After recrystallization from ethanol-petroleum ether, O,O-dimethyl-6-chloro-4-amino-1,3-benzenedisulfohydroxamic acid melted at 174–175°. Yield 5 g.

Analysis.—Calcd. for $C_8H_{12}N_3O_6S_2Cl$: C, 27.79; H, 3.50. Found: C, 27.59; H, 3.55.

EXAMPLE 8

Dimethyl Ester of 6-Chloro-4-Acetamido-1,3 Benzenedisulfohydroxamic acid 11 g. of 6-chloro-4-acetamido-1,3-benzenedisulfochloride was added to a solution of 12.5 g. of methoxyamine hydrochloride in 100 cc. of pyridine. After standing overnight at room temperature, the solution was added to 400 cc. of 10% HCl. The resulting mixture of oil and solids was extracted with ether, the extract was dried over sodium sulfate and taken to dryness. The residue solidified after treatment with benzene. After recrystallization from ethyl acetate-petroleum ether, O,O-dimethyl-6-chloro-4-acetamido-1,3-benzenedisulfohydroxamic acid melted at 170–171°. Yield 6.5 g.

*Analysis.*—Calcd. for $C_{10}H_{14}N_3O_7S_2Cl$: C, 30.97; H, 3.64. Found: C, 30.77; H, 3.77.

EXAMPLE 9

*Dimethyl Ester of 5-Aminotoluene-2,4-Disulfohydroxamic Acid*

11.7 g. of 5-aminotoluene-2,4-disulfochloride was added to a solution of 13 g. of methoxyamine hydrochloride in 100 cc. of pyridine. After standing overnight at room temperature, the solution was added to 400 cc. of 10% HCl. The precipitated solids were filtered off, washed and air-dried. After recrystallization from ethanol-water, O,O-dimethyl-5-aminotoluene-2,4-disulfohydroxamic acid melted at 217–218° (dec.). Yield 8 g.

*Analysis.*—Calcd. for $C_9H_{15}N_3O_6S_2$: C, 33.22; H, 4.65. Found: C, 33.37; H, 4.63.

EXAMPLE 10

*Dimethyl Ester of 4,5-Dichloro-m-Benzenedisulfohydroxamic Acid*

22 g. of 4,5-dichloro-m-benzenedisulfochloride was added to a solution of 21.5 g. of methoxyamine hydrochloride in 200 cc. of pyridine. After standing overnight at room temperature, the solution was added to 800 cc. of 10% HCl. The precipitated oil was extracted with ether, the extract was dried over sodium sulfate and taken to dryness. The residue solidified after treatment with benzene. After recrystallization from ethanol-water, O,O-dimethyl-4,5-dichloro-m-benzenedisulfohydroxamic acid melted at 158–159°. Yield 20 g.

*Analysis.*—Calcd. for $C_8H_{10}N_2O_6S_2Cl_2$: C, 26.32; H, 2.76. Found: C, 26.27; H, 2.50.

EXAMPLE 11

*Diethyl Ester of 4,5-Dichloro-m-Benzenedisulfohydroxamic Acid*

12 g. of 4,5-dichloro-m-benzenedisulfochloride was added to a solution of 17 g. of ethoxyamine hydrochloride in 100 cc. of pyridine. After standing overnight at room temperature, the solution was added to 400 cc. of 10% HCl. The precipitated oil was extracted with ether, the extract was dried over sodium sulfate and evaporated to dryness. The residue solidified after treatment with benzene. After recrystallization from benzene-petroleum ether, O,O-diethyl-4,5-dichloro-m-benzenedisulfohydroxamic acid melted at 111–113°. Yield 10 g.

*Analysis.*—Calcd. for $C_{10}H_{14}N_2O_6S_2Cl_2$: C, 30.54; H, 3.59. Found: C, 30.56; H, 3.72.

EXAMPLE 12

*Dipropyl Ester of 4,5-Dichloro-m-Benzenedisulfohydroxamic Acid*

10 g. of 4,5-dichloro-m-benzenedisulfochloride was added to a solution of 16 g. of propoxyamine hydrochloride in 100 cc. of pyridine. After standing at room temperature overnight, the solution was added to 400 cc. of 10% HCl. The precipitated oil was extracted with ether, the extract was dried over sodium sulfate and taken to dryness. The residue solidified after treatment with benzene. After recrystallization from benzene-petroleum ether, O,O-dipropyl-4,5-dichloro-m-benzenedisulfohydroxamic acid melted at 97–98°. Yield 7 g.

*Analysis.*—Calcd. for $C_{12}H_{18}N_2O_6Cl_2S_2$: C, 34.21; H, 4.31. Found: C, 34.38; H, 4.60.

EXAMPLE 13

*Diallyl Ester of 4,5-Dichloro-m-Benzenedisulfohydroxamic Acid*

8 g. of 4,5-dichloro-m-benzenedisulfochloride was added to a solution of 14 g. of allyloxyamine hydrochloride in 100 cc. of pyridine. After standing at room temperature overnight, the solution was added to 400 cc. of 10% HCl. The precipitated oil was extracted with ether, the extract was dried over sodium sulfate and evaporated to dryness. The residue solidified after treatment with ligroin. After recrystallization from benzene-petroleum ether, O,O-diallyl-4,5-dichloro-m-benzenedisulfohydroxamic acid melted at 103–104°. Yield 6.6 g.

*Analysis.*—Calcd. for $C_{12}H_{14}N_2O_6Cl_2S_2$: C, 34.54; H, 3.38. Found: C, 35.00; H, 3.47.

EXAMPLE 14

*Dipropargyl Ester of 4,5-Dichloro-m-Benzenedisulfohydroxamic Acid*

10 g. of 4,5-dichloro-m-benzenedisulfochloride was added to 17.5 g. of propargyloxyamine hydrochloride in 100 cc. of pyridine. After standing overnight at room temperature, the solution was added to 400 cc. of 10% HCl. The precipitated oil was extracted with ether, the extract was dried over sodium sulfate, and evaporated to dryness. The residue solidified after treatment with benzene. After recrystallizaton from benzene-petroleum ether, O,O-dipropargyl-4,5-dichloro-m-benzenedisulfohydroxamic acid melted at 133–134°. Yield 10 g.

*Analysis.*—Calcd. for $C_{12}H_{10}N_2O_6Cl_2S_2$: C, 34.87; H, 2.44; S, 15.51. Found: C, 35.13; H, 2.34; S, 15.38.

EXAMPLE 15

*Dimethyl Ester of 5-Chloro-4-Amino-1,3-Benzenedisulfohydroxamic Acid*

13 g. of 5-chloro-4-amino-1,3-benzenedisulfochloride was added to a solution of 13 g. of methoxyamine hydrochloride in 100 cc. of pyridine. After standing at room temperature overnight, the solution was added to 400 cc. of 10% HCl. The precipitated solids were filtered off, washed with water and air-dried. After recrystallization from ethanol, O,O-dimethyl-5-chloro-4-amino-1,3-benzenedisulfohydroxamic acid melted at 215–217° (dec.). Yield 8.6 g.

*Analysis.*—Calcd. for $C_8H_{12}N_3O_6S_2Cl$: C, 27.79; H, 3.50. Found: C, 28,13; H, 3.39.

EXAMPLE 16

*Dimethyl Ester of 6-Chlorotoluene-3,5-Disulfohydroxamic Acid*

11.6 g. of 6-chlorotoluene-3,5-disulfochloride was added to a solution of 13 g. of methoxyamine hydrochloride in 100 cc. of pyridine. After standing at room temperature overnight, the solution was added to 400 cc. of 10% HCl. The precipitated oil was extracted with ether, the extract was dried over sodium sulfate, and taken to dryness. The residue solidified after treatment with benzene. After recrystallization from ethanol-water, O,O-dimethyl-6-chlorotoluene-3,5-disulfohydroxamic acid melted at 145–147°. Yield 8 g.

*Analysis.*—Calcd. for $C_9H_{13}N_2O_6S_2Cl$: C, 31.35; H, 3.80; S, 18.60. Found: C, 32.03; H, 4.10; S, 18.42.

EXAMPLE 17

*Dimethyl Ester of 2-Aminotoluene-3,5-Disulfohydroxamic Acid*

11.7 g. of 2-aminotoluene-3,5-disulfochloride was added to a solution of 13 g. of methoxyamine hydrochloride in 100 cc. of pyridine. After standing overnight at room temperature, the solution was added to 400 cc. of 10% HCl. The resulting mixture of oil and solids was extracted with ether, the extract was dried over sodium sulfate, and taken to dryness. The residue solidified after treatment with benzene. After recrystallization from ethanol-water, O,O-dimethyl-2-aminotoluene-3,5-disulfohydroxamic acid melted at 225–227° (dec.). Yield 6 g.

*Analysis.*—Calcd. for $C_9H_{15}N_3O_6S_2$: C, 33.22; H, 4.65; S, 19.71. Found: C, 33.18; H, 4.81; S, 19.90.

EXAMPLE 18

Dimethyl Ester of 2,5-Dichloro-m-Benzenedisulfohydroxamic Acid 9 g. of 2,5-dichloro-m-benzenedisulfochloride was added to a solution of 8.5 of methoxyamine hydrochloride in 100 cc. of pyridine. After standing overnight at room temperatutre, the solution was added to 400 cc. of 10% HCl. The precipitated solids were filtered off, washed with water and air-dried. After recrystallization from ethanol-water, O,O-dimethyl-2,5-dichloro-m-benzenedisulfohydroxamic acid melted at 216–217°. Yield 8 g.

*Analysis.*—Calcd. for $C_8H_{10}N_2O_6S_2Cl_2$: C, 26.32; H, 2.76; S, 17.56. Found: C, 26.66; H, 3.01; S, 17.66.

EXAMPLE 19

Dimethyl Ester of 4-Chlorotoluene-2,6-Disulfohydroxamic Acid 11.6 g. of 4-chlorotoluene-2,6-disulfochloride was added to a solution of 13 g. of methoxyamine hydrochloride in 100 cc. of pyridine. After standing overnight at room temperature, the solution was added to 400 cc. of 10% HCl. The precipitated solids were filtered off, washed with water and air-dried. After recrystallization from ethanol-water, O,O-dimethyl-4-chlorotoluene-2,6-disulfohydroxamic acid melted at 202–204°. Yield 9 g.

*Analysis.*—Calcd. for $C_9H_{13}N_2O_6S_2Cl$: C, 31.80; H, 3.80; S, 18.60. Found: C, 31.47; H, 3.74; S, 18.57.

EXAMPLE 20

Dimethyl Ester of 5-Chloro-2-Amino-1,3-Benzenedisulfohydroxamic Acid 12 g. of 5-chloro-2-amino-1,3-benzenedisulfochloride was added to a solution of 13 g. of methoxyamine hydrochloride in 100 cc. of pyridine. After standing at room temperature overnight, the solution was added to 400 cc. of 10% HCl. The precipitated solids were filtered off, washed with water and air-dried. After recrystallization from ethanol-water, O,O-dimethyl-5-chloro-2-amino-1,3-benzenedisulfohydroxamic acid melted at 186–187°. Yield 8.7 g.

*Analysis.*—Calcd. for $C_8H_{12}N_3O_6S_2Cl$: C, 27.79; H, 3.50; S, 18.54. Found: C, 27.74; H, 3.32; S, 18.64.

EXAMPLE 21

Dimethyl Ester of 4-Aminotoluene-3,5-Disulfohydroxamic Acid 11.6 g. of 4-aminotoluene-3,5-disulfochloride was added to a solution of 13 g. of methoxyamine hydrochloride in 100 cc. of pyridine. After standing overnight at room temperature, the solution was added to 400 cc. of 10% HCl. The precipitated solids were filtered off, washed with water and air-dried. After recrystallization from ethanol-water, O,O-dimethyl-4-aminotoluene-3,5-disulfohydroxamic acid melted at 202–203°. Yield 9 g.

*Analysis.*—Calcd. for $C_9H_{15}N_3O_6S_2$: C, 33.22; H, 4.65; S, 19.71. Found: C, 33.94; H, 4.49; S, 20.18.

EXAMPLE 22

Dimethyl Ester of 4-Bromo-m-Benzenedisulfohydroxamic Acid 28 g. of 4-bromo-m-benzenedisulfochloride was added to a solution of 26 g. of methoxyamine hydrochloride in 100 cc. of pyridine. After standing overnight at room temperature, the solution was added to 300 cc. of 10% HCl. The precipitated oil was extracted with ether, the extract was dried over sodium sulfate and taken to dryness. The residue crystallized after treatment with benzene. After recrystallization from ethanol-water, O,O-dimethyl-4-bromo-m-benzenedisulfohydroxamic acid melted at 131–132°. Yield 17 g.

*Analysis.*—Calcd. for $C_8H_{11}N_2O_6S_2Br$: C, 25.61; H, 2.95. Found: C, 25.88; H, 3.15.

We claim:

1. A compound selected from the group consisting of diesters of m-benzenedisulfohydroxamic acid with lower aliphatic alcohols which consist entirely of carbon and hydrogen atoms and a single oxygen atom, and salts thereof with non-toxic, pharmaceutically acceptable bases; said compound containing from zero to two (inclusive) nuclear substituents selected from the group consisting of lower alkyl, bromine chlorine, amino and lower alkanoylamino.

2. A compound represented by the general formula

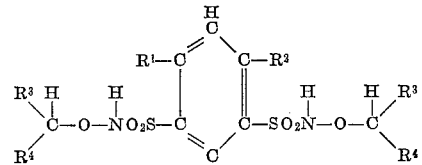

wherein each of the symbols $R^1$ and $R^2$ represents a member selected from the group consisting of lower alkyl, bromine, chlorine, amino and lower alkanoylamino; and each of the symbols $R^3$ and $R^4$ represents a member selected from the group consisting of hydrogen and acyclic hydrocarbon radicals, the sum of the carbon atoms in the group

being not more than seven.

3. A compound represented by the general formula

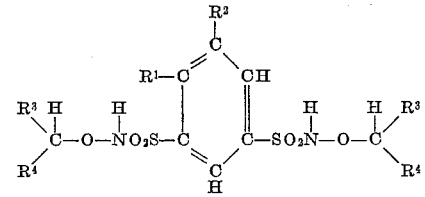

wherein each of the symbols $R^1$ and $R^2$ represents a member selected from the group consisting of lower alkyl, bromine, chlorine, amino and lower alkanoylamino; and each of the symbols $R^3$ and $R^4$ represents a member selected from the group consisting of hydrogen and acyclic hydrocarbon radicals, the sum of the carbon atoms in the group

being not more than seven.

4. A compound represented by the general formula

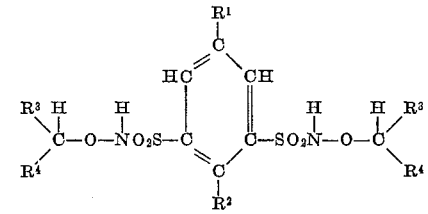

wherein each of the symbols $R^1$ and $R^2$ represents a member selected from the group consisting of lower alkyl, bromine, chlorine, amino and lower alkanoylamino; and each of the symbols $R^3$ and $R^4$ represents a member selected from the group consisting of hydrogen and acyclic hydrocarbon radicals, the sum of the carbon atoms in the group

being not more than seven.

5. O,O-dimethyl-4,5-dichloro-m-benzenedisulfohydroxamic acid.
6. O,O-dimethyl-5-chlorotoluene-2,4-disulfohydroxamic acid.
7. O,O-dimethyl-6-chlorotoluene-3,5-disulfohydroxamic acid.
8. O,O-dimethyl-4-chloro-m-benzenedisulfohydroxamic acid.
9. O,O-dimethyl-4-chlorotoluene-2,6-disulfohydroxamic acid.

References Cited in the file of this patent
UNITED STATES PATENTS

| | | |
|---|---|---|
| 2,321,891 | Berchet | June 15, 1943 |
| 2,640,853 | Sundholm | June 2, 1953 |

OTHER REFERENCES

Suter: "The Organic Chemistry of Sulfur," 1944, pp. 614–615. (Copy in Sci. Library.)